United States Patent [19]
Kotzin

[11] Patent Number: 5,086,468
[45] Date of Patent: Feb. 4, 1992

[54] TEXT MODIFIER

[75] Inventor: Michael D. Kotzin, Buffalo Grove, Ill.

[73] Assignee: Motorola, Inc., Schaumburg, Ill.

[21] Appl. No.: 615,108

[22] Filed: Nov. 19, 1990

Related U.S. Application Data

[63] Continuation of Ser. No. 376,776, Jul. 7, 1989.

[51] Int. Cl.$^5$ ............................................. H04L 9/02
[52] U.S. Cl. ....................................... 380/28; 380/43
[58] Field of Search ..................... 380/21, 28, 37, 42, 380/43, 44, 49

[56] References Cited

U.S. PATENT DOCUMENTS

| | | | |
|---|---|---|---|
| 4,074,066 | 2/1978 | Ehrsam et al. | 380/28 |
| 4,805,216 | 2/1989 | Gruenberg | 380/28 |
| 4,815,130 | 3/1989 | Lee et al. | 380/37 |
| 4,897,876 | 1/1990 | Davies | 380/43 |

Primary Examiner—Thomas H. Tarcza
Assistant Examiner—Tod R. Swann
Attorney, Agent, or Firm—Wayne J. Egan

[57] ABSTRACT

A method is disclosed and apparatus is described whereby plain text is modified before it is input to a binary key generator (encryptor). According to the invention, a plain text bit may be modified by a current modifying bit, which in turn, is based on a prior modifying bit, a prior plain text bit, and a prior ciphered text bit. The only data path provided to the transmitter is the encrypted key generator cipher text output. As a result, the only feed-forward path of the plain text to the channel is through the key generator, and thus the fault-immune physical barrier between the plain text and the cipher information inherent with the key generator is maintained. The invention provides a way of utilizing conventional binary key generators to digitally encrypt for radio transmission multilevel sub-band coded speech.

5 Claims, 1 Drawing Sheet

TEXT MODIFIER

This is a continuation of application Ser. No. 07/376,776, filed Jul. 7, 1989.

TECHNICAL FIELD

This application relates to a method and apparatus to provide a plain text modifier to permit sample masked encryption utilizing a binary key generator or encryption device.

BACKGROUND OF THE INVENTION

Binary encryption devices for encrypting digital information, or key generators, are known. As is known, such key generators are typically used to encode plain text, such as a user's digitally coded speech, and to transmit the resulting ciphered text over a channel. Internally, a typical key generator generates a synchronized pseudo random stream of bits based on a key which are individually combined with the input plain text bits. Often this is done with an EXCLUSIVE OR gate. The resulting bit stream is output as ciphered text. Means of synchronizing these devices are well known and are not addressed in this specification.

Also known are various types of information coding. One of these used for efficiently coding speech for transmission over radio is multilevel sub-band coding (MSBC). In addition to various data overhead, MSBC produces output having n-bit samples whose magnitudes are algorithmically obtained from the original speech input and maintain a proportionality to some characteristic (e.g. voltage, energy, etc.) of the processed speech. In an MSBC word, the individual bits are ordered in a monotonically increasing fashion, the least significant bit coming first, the most significant bit coming last. The most desirable approach to providing digitally secure encryption of these samples (while maintaining MSBC's advantageous spectral efficiency, robustness to radio channel impairments, and speech quality) is to perform sample masking on each individual MSBC word. Therefore, encrypting these samples requires adding a pseudo random n-bit vector in a modulo $2^n - 1$ fashion.

Currently available key generators for digital encryption are designed for the encryption of binary data only. These key generators are not capable of performing the necessary modulo addition of the random data with the MSBC plain text information.

Several techniques have previously been suggested. One approach is to feed the ciphered output of the key generator (using a fixed input value as the plain text input) as well as the MSBC plain text samples to an additional external adder circuit whose output would then be transmitted on the channel. The problem with this approach is that the external adder circuit contains both plain and cipher text information and provides the path of data to the transmitter. This results in an arrangement being viewed as somewhat "less secure" than having the key generator, which has specially designed output latches and fault detection circuitry) provide an exclusive barrier between the plain text and the channel.

Therefore, it would be desirable to provide a means to perform sample masked encryption using a binary encryptor that would permit the binary key generator output alone to provide the transmitter data.

SUMMARY OF THE INVENTION

It is an object of the present invention to provide a plain text modifier that enables performing sample masked encryption in such a way that a binary key generator cipher text output alone provides data to the transmitter. According to the invention, a method is disclosed and apparatus is described whereby the current plain text bit may be modified based on a current modifying bit before it is input to the key generator. The current modifying bit, in turn, may be based on the prior modifying bit, the prior plain text bit, and the prior ciphered text bit. The key generator output therefore may alone provide data to the transmitter. Since the text modifying apparatus is connected to the input of the key generator, compromising faults do not impact the interconnection between the key generator output and the channel. As a result, the only feedforward path of the plain text to the channel is through the key generator, and thus the fault-immune physical barrier between the plain text and the cipher information inherent with the key generator is maintained. The invention provides a way of encryption MSBC plain text using a conventional binary key generator.

DETAILED DESCRIPTION OF THE INVENTION

Figure 1:
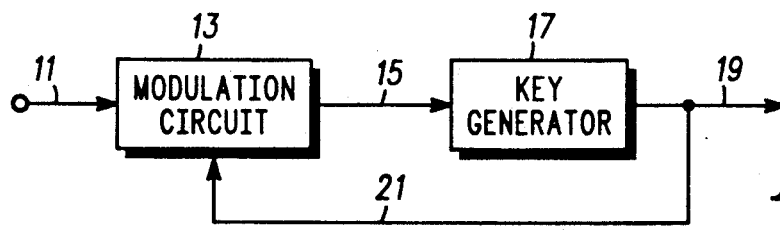
FIG. 1 is a block diagram of a first embodiment of a text modifier, according to the invention.

FIG. 1 is a block diagram of a first embodiment of the sample masking encryption technique, according to the invention.

As shown, a bit stream of plain text (PT) bits 11, each bit thereof designated $PT_i$, are input to the modifier 13. The PT bits 11 are arranged in monotonically increasing order, the least significant bit coming first, followed by more significant bits. It will be assumed that the PT 11 bit stream is arranged into words (or sub-streams, or groups), with the initial (and least significant bit) of each word designated $PT_1$. Further, it will be assumed that each PT 11 word (or sub-stream) comprises the same number (n) of bits, and thus the final (and most significant) bit of each PT word is $PT_n$. It will be appreciated, however, that the PT bit stream components or sub-streams may be of non-uniform length, and thus the number of bits in each PT group or word may vary. It will further be appreciated that the PT bit stream 11 may comprise an integral bit stream that is undivided into smaller (or component) sub-bit streams, or words.

The modifier 13, in turn, provides a bit stream of modified plain text (MPT) bits 15, each bit thereof designated $MPT_i$ which, in turn, are input to the key generator 17. The key generator 17 is a typical key generator as in the prior art. The key generator 17, in turn, provides a bit stream of ciphered text (CT) bits 19, each bit thereof designated $CT_i$ which may then be immediately and directly transmitted to the channel (not shown). As shown, the ciphered text bit stream CT bits 19 are fed back to the modifier 13 via feed-back path 21. The modifier 13 thus provides the modified plain text bit stream 15 based at least in part on the plain text bit stream 11 and the ciphered text bit stream 19. The key generator 17 is a typical key generator as in the prior art. One such version may be adequately modeled simply as a pseudo random bit generator exclusive or'ed with a plain text input with a single latch between the exclusive or device and the cipher text output.

It is assumed that bits of the same i-value are associated with each other. Thus, for an arbitrary plain text 11 bit $PT_i$, the corresponding modified plain text 15 bit would be $MPT_i$. Likewise, for an arbitrary modified plain text 15 bit $MPT_i$, the corresponding ciphered text 19 bit would be $CT_i$.

Figure 2:
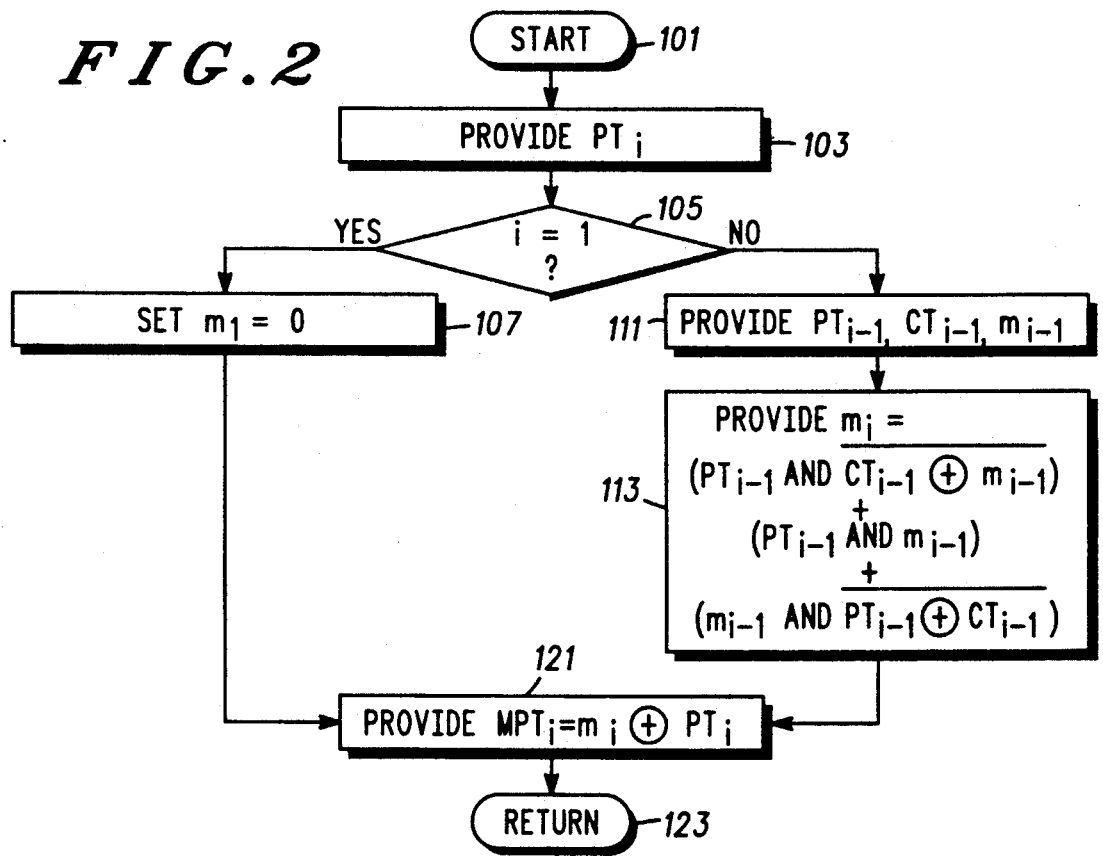
FIG. 2 is a flow diagram for the first embodiment.

FIG. 2 is a flow diagram for the first embodiment.

The process starts at step 101, and then proceeds to provide the current $PT_i$, step 103. The process next determines whether this is an initial PT bit, step 105. This is equivalent to determining whether i=1. It will be appreciated that, in case the PT bit stream comprises sub-streams or words, then the determination here (step 105) will be affirmative on the initial bit of each word.

If this is an initial PT bit, then the determination to step 105 is affirmative (since i=1), and the process next sets a current modifier bit $m_i$ (or $m_1$, since i=1) equal to logic zero (0), step 107. The process next goes to step 121, where it provides the current MPT bit $MPT_i$ by computing $PT_i$ EXCLUSIVE OR $m_i$. The process then returns (step 123) to start, step 101.

It will be appreciated that, in view of the fact that $m_i=0$ for i=1, then $MPT_1 = PT_1$.

Otherwise, in cases where the current PT bit is not an initial PT bit or where i is not equal to 1, then the determination to step 105 is negative, and the process goes to step 111. Here (step 111) the process provides the values for the PT bit, the CT bit, and the modifier bit immediately preceding, or $PT_{i-1}$, $CT_{i-1}$, and $m_{i-1}$, respectively. The process next provides the current modifier bit, $m_i$, step 113, based on the bits $PT_{i-1}$, $CT_{i-1}$, and $m_{i-1}$. This is equivalent to computing via Boolean Algebra the following:

the quantity $PT_{i-1}$ AND the inverse of the quantity $CT_{i-1}$ EXCLUSIVE OR $m_{i-1}$, OR the quantity $PT_{i-1}$ AND $m_{i-1}$, OR the quantity $m_{i-1}$ AND the inverse of the quantity $PT_{i-1}$ EXCLUSIVE OR $CT_{i-1}$.

The process next goes to step 121, wherein it provides the current MPT bit $MPT_i$ by computing $PT_i$ EXCLUSIVE OR $m_i$.

Figure 3:
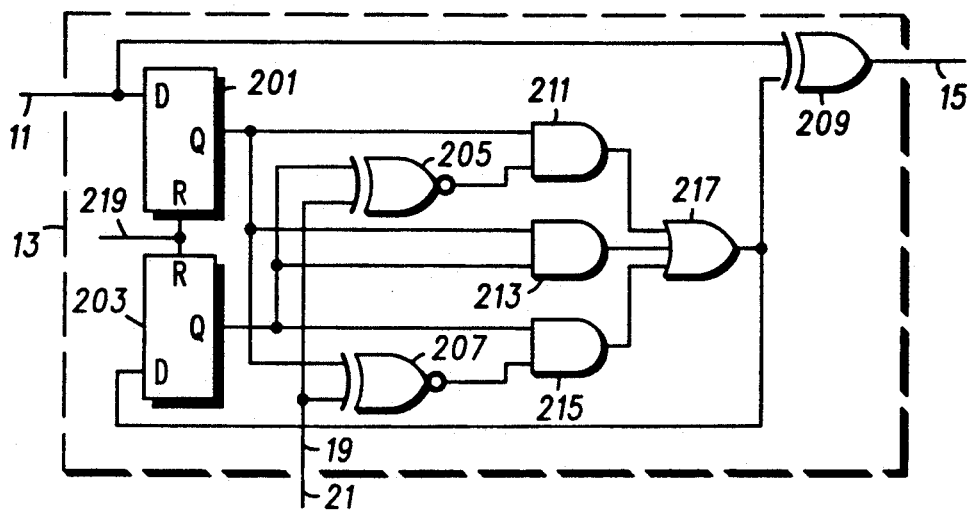
FIG. 3 is a typical circuit diagram for the first embodiment.

FIG. 3 is a typical circuit diagram for the first embodiment. As shown, the modifier circuit 13 receives plain text 11 as an input and provides modified plain text 15 as an output. The modifier circuit 13 also receives ciphered text 15 as an input via feed-back path 21. As shown, the modifier circuit 13 comprises two (2) D-type flip/flops 201 and 203, two (2) EXCLUSIVE NOR-type gates 205 and 207, three (3) AND-type gates 211, 213 and 215, one (1) OR-type gate 217, and one EXCLUSIVE OR-type gate 209. For an initial bit $PT_1$, the modifier circuit 13 may be initialized by resetting flip/flops 201 and 203 by RESET lead 219. Thus, if the PT bit stream 11 comprises words of n bits each designated $PT_1, PT_2, \ldots, PT_n$, then the circuit 13 may be reset in the interval between adjacent words, or after each $PT_n$ and before the $PT_1$ of the next word. For simplicity, the clocking signal, the power supply and ground are not shown.

As noted previously, the bit index nomenclature (i) indicates logical correspondence of bit signals. This is illustrated by considering a different key generator (not shown) whose equivalent circuit might include an additional latch (or other delay) preceding the cipher text output signal. To accommodate the resulting off-set in time and to maintain the logical correspondence of the bit signals, a compensating approach such as the following might be employed. Here, additional latches (or other delay) would be inserted in the modifier 13 following each of the existing latches shown in FIG. 3 to cure the off-set in time.

It will be appreciated that the foregoing compensating technique would create a problem since the key generator would need to cycle twice for each PT input bit in order to produce the corresponding CT output bit. To avoid this problem, two independent plain text words could be encrypted by multiplexing (or interleaving) between the bits of each word. CT bits out of the key generator could then be de-multiplexed (or de-interleaved) to form the final encrypted CT words.

It will be appreciated that alternative implementations exist for the particular circuit depicted in FIG. 3. For example, the circuit may be variously implemented in software via a suitably-programmed computer or microprocessor. Or else the circuit may be variously implemented in hardware using a different arrangement of flip-flops and gates, etc.

While various embodiments of the sample masked encryption technique and plain text modifier, according to the invention, have been disclosed herein, the scope of the invention is defined by the following claims.

What is claimed is:

1. A method for forming a "z" bit stream having bits designated $z_i$, based on an "x" bit stream having bits designated $x_i$, each $x_i$ of successively increasing order, the least significant bit $x_1$ coming first, and based on a "y" bit stream having bits designated $y_i$, comprising the steps of setting $z_1 = x_1$, and for i not equal to 1:

(a) providing a modifying bit $m_i$, based on $x_{i-1}$, $y_{i-1}$, and the prior modifying bit $m_{i-1}$, (b) providing $z_i$ based on $x_i$ and $m_i$, where $m_1$ = logic zero (0), wherein said z bit stream is input to a binary encryption device.

2. A method for forming a modified text "z" bit stream input to a binary encryption device having bits designated $z_i$, based on a plain text "x" bit stream having bits designated $x_i$, each $x_i$ of successively increasing order, the least significant $x_1$ coming first, and based on a ciphered text "y" bit stream output from said binary encryption device having bits designated $y_i$, comprising the steps of setting $z_1 = x_1$, and for i not equal to 1:

(a) providing a modifying bit $m_i$ based on $x_{i-1}$, $y_{i-1}$, and the prior modifying bit $m_{i-1}$, (b) providing $z_i$ based on $x_i$ and $m_i$, where $m_1$ = logic zero (0).

3. The method of claim 2 wherein said providing step (b) includes computing $x_i$ EXCLUSIVE OR $m_i$.

4. The method of claim 2 wherein said plain text x bit stream comprises one or more component or sub-bit streams (or "words"), each word having n bits.

5. The method of claim 2 wherein said plain text x bit stream comprises one or more component or sub-bit streams (or "words"), each word having n bits, each a multilevel sub-band code sample.

* * * * *